United States Patent

Boatwright et al.

[15] 3,663,769
[45] May 16, 1972

[54] METHOD AND APPARATUS FOR TESTING A COMMUNICATION LINE

[72] Inventors: John T. Boatwright, Hopkinton; Donald L. Knight, Concord, both of N.H.

[73] Assignee: Northeast Electronics Corporation, Concord, N.H.

[22] Filed: July 25, 1969

[21] Appl. No.: 844,965

[52] U.S. Cl. ........................................................179/175.3
[51] Int. Cl. ........................................................H04b 3/46
[58] Field of Search ..................179/175.3, 175.31 R; 324/95

[56] References Cited

UNITED STATES PATENTS

| | | | |
|---|---|---|---|
| 2,953,743 | 9/1960 | Desoer | 179/175.3 |
| 3,054,865 | 9/1962 | Holloway et al. | 179/175.31 |
| 3,526,299 | 9/1970 | Andrews, Jr. et al. | 179/175.3 |

*Primary Examiner*—Kathleen H. Claffy
*Assistant Examiner*—Douglas W. Olms
*Attorney*—Raymond J. McElhannon

[57] ABSTRACT

Testing of a communication line is accomplished by disposing a voltage controlled oscillator, e.g., a gas tube relaxation type, across the line at a distant point and applying a DC voltage to the line at a near point of sufficient magnitude to initiate oscillator operation, the AC signal generated by the oscillator being detected, and analyzed if desired, at the near point.

15 Claims, 9 Drawing Figures

Patented May 16, 1972 3,663,769

3 Sheets-Sheet 1

INVENTORS
JOHN T. BOATWRIGHT
DONALD L. KNIGHT

BY Ward McElhannon Brooks Fitzpatrick
ATTORNEYS

INVENTORS
JOHN T. BOATWRIGHT
BY DONALD L. KNIGHT
Ward McElhannon Brooks Fitzpatrick
ATTORNEYS

INVENTORS
JOHN T. BOATWRIGHT
BY DONALD L. KNIGHT

Wood, McClelland, Brooks & Fitzpatrick
ATTORNEYS

METHOD AND APPARATUS FOR TESTING A COMMUNICATION LINE

The present invention relates to a method and apparatus for testing a communication line. More particularly, it relates to an arrangement for testing a line of the type capable of communicating between two points both a DC voltage and an AC signal.

While not limited thereto, the present invention is particularly well suited to the testing of telephone lines between near and distant points. There has always existed a need for a simple and inexpensive but reliable arrangement for performing such tests. Specifically, it is desirable to insure the integrity and quality of any communication line by subjecting it to periodic testing in order to take remedial action if the characteristics of the line deteriorate.

An object of the present invention is to provide an inexpensive but reliable system for testing telephone lines and the like.

It is a further object of the invention to provide a test system for ascertaining not only the integrity of a communication line but the signal handling characteristics thereof.

In accordance with one aspect of the invention there is provided a system for testing between two distant points an interconnecting communication line which is capable of communicating therebetween a DC voltage and an AC signal, the system comprising in combination voltage controlled oscillator means coupled across the line at one of the points, the oscillator means being triggerable into oscillation by the application of a DC voltage thereto from the line in excess of a predetermined magnitude for generating and applying a characteristic AC signal to the line; and test control means arranged to be coupled to the line at the other of the points, the test control means including means for selectably applying to the line a DC voltage in excess of the predetermined magnitude, and means for detecting the characteristic signal.

In accordance with another aspect of the invention there is provided a method of testing a communication line of the type described above, which method comprises the steps of providing a voltage controlled oscillator at a distant point along the line connected thereacross, applying a DC voltage to the line at a near point of sufficient magnitude to cause oscillation of the oscillator, and detecting at the near point any oscillatory signal on the line due to oscillation of the oscillator.

The invention will be better understood after reading the following detailed description of the presently preferred embodiments thereof with reference to the accompanying drawings wherein.

Figure 1:
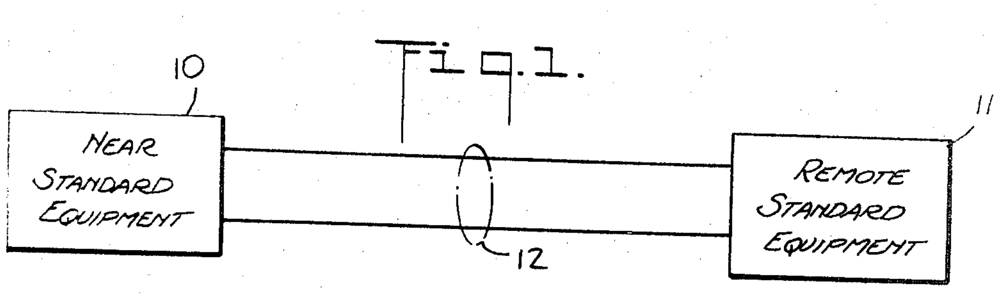
FIG. 1 is a schematic block diagram illustrating a typical line in general form to which the test system is applicable.

Referring now to FIG. 1, there is shown the basic components of a communication link consisting of the near standard equipment 10, the remote standard equipment 11, and the interconnecting communication line 12. The near and remote standard equipment may take most any form as will be apparent from the discussion of the invention that follows. The communication line 12 need not, necessarily, consist of a metallic circuit, but may comprise an equivalent thereof. By equivalent, it is intended to mean any circuit wherein the insertion of direct currents at one end of the circuit results in the appearance of correlated direct currents at the other end of the circuit.

Figure 2:
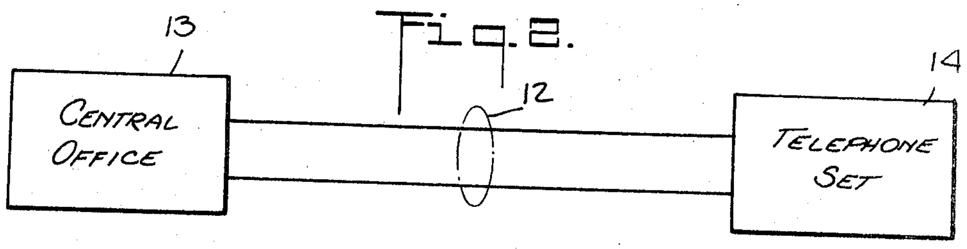
FIG. 2 is a schematic diagram similar to FIG. 1 showing a more specific communication line and equipment.

As seen in FIG. 2, a typical communication link is illustrated as consisting of a telephone central office 13 connected by the line 12 to a telephone set 14. It should be recognized that the central office 13 and the telephone set 14 correspond, respectively, to the near standard equipment 10 and the remote standard equipment 11 of FIG. 1.

Figures 3, 4, 5, 6:
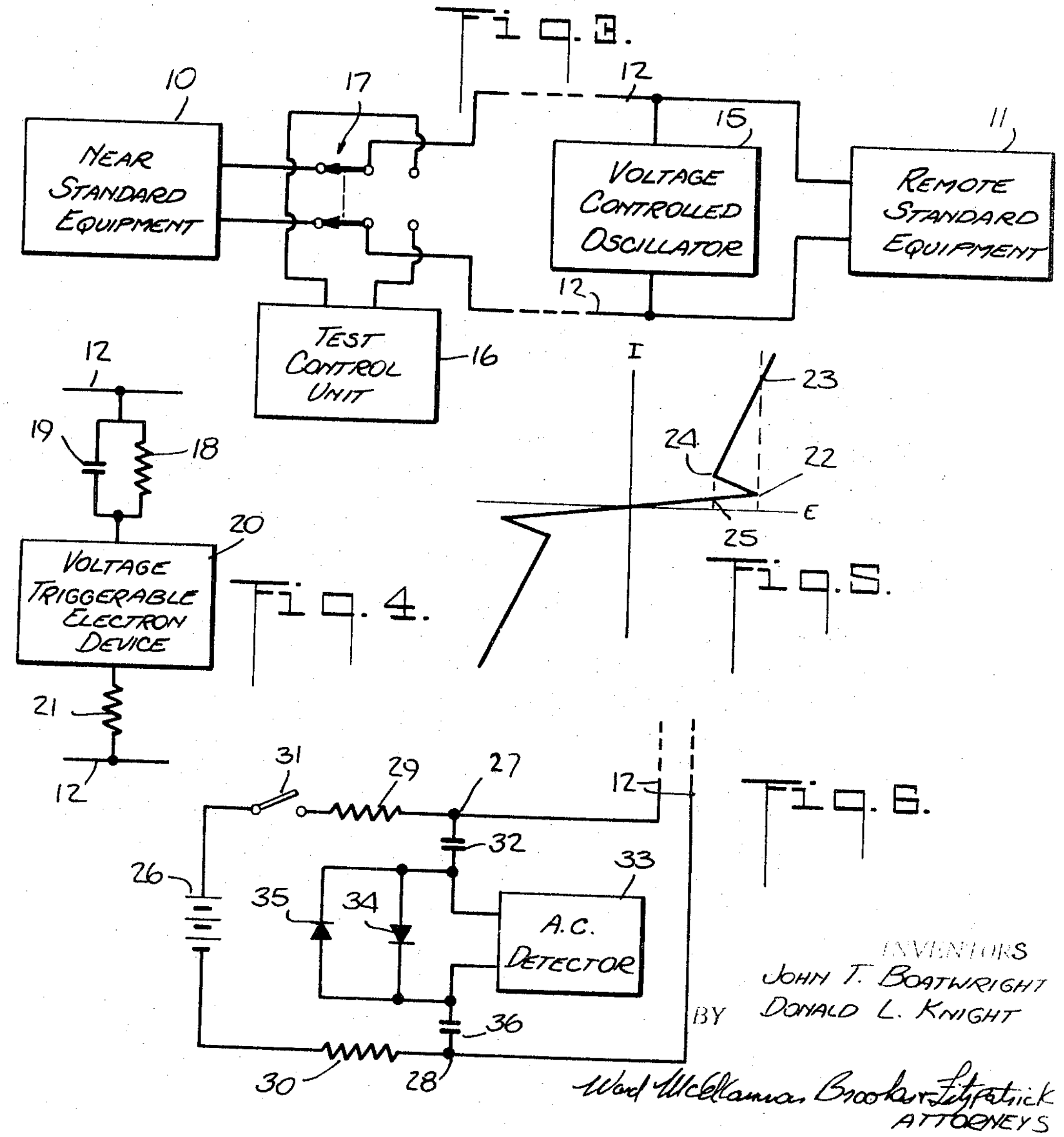
FIG. 3 is a schematic diagram showing the basic units of the system in accordance with the invention connected to a line to be tested.
FIG. 4 is a schematic diagram of a voltage controlled oscillator as employed in the system of FIG. 3.
FIG. 5 is a voltage-current curve showing the characteristics of the electron device employed in the oscillator of FIG. 4.
FIG. 6 is a schematic diagram of one form of test control means useful in the combination of FIG. 3.

In order to provide for testing the line 12, a voltage controlled oscillator 15 may be connected across the line near the remote standard equipment as seen in FIG. 3, while a test control unit 16 is provided connectable across the line 12 adjacent the near standard equipment 10 by means of a double-pole double-throw switch 17. With the switch 17 in the position shown in FIG. 3, the near standard equipment 10 is connected over the line 12 to the remote standard equipment 11. When it is desired to test the line, the switch 17 is thrown to its alternative position wherein the near standard equipment 10 is removed from the circuit and the test control unit 16 is connected across the line 12.

The voltage controlled oscillator 15 may take the form of the oscillator shown in detail in FIG. 4. As seen in FIG. 4, a time constant circuit consisting of the resistor 18 in parallel with the capacitor 19 is connected in series with a voltage triggerable electron device 20 and a resistor 21 across the two conductors of the line 12. The voltage triggerable electron device 20 may be a simple two-element gas tube or an equivalent semi-conductor device or the like having a voltage-current characteristic as shown in FIG. 5. For example, it is well known that a two-element gas tube will begin to conduct slightly as voltage is applied thereto and will increase its conduction at a very slow rate as the voltage is increased until a point known as its breakdown voltage is reached represented by the point 22 on the curve in FIG. 5. At breakdown, the current through the device 20 will increase abruptly. If it is assumed that a negligible voltage drop exists across the capacitor 19 at breakdown, the device 20 will suddenly shift its operating point to the point 23 on the curve of FIG. 5.

Due to the conduction of device 20, the capacitor 19 will rapidly charge causing the voltage across the device 20 to decrease toward the point 24 on the curve of FIG. 5. If the values of the resistors 18 and 21 are selected such that the voltage represented by the point 24 is below the sustaining voltage of the device 20, the latter will cease conducting. That is, the operating point of the device 20 will abruptly shift to the point 25 on the curve of FIG. 5. After a period of time determined by the time constant of the capacitor 19 and resistor 18, the voltage across the capacitor 19 will decrease sufficiently to cause breakdown again of the device 20 initiating another cycle of the oscillator. It should be recognized that the circuit shown in FIG. 4 is a well known relaxation oscillator.

As mentioned above, a semi-conductor device having the characteristics of FIG. 5 can be used instead of a gas tube. A diac is a typical example.

In order to initiate oscillation of the voltage controlled oscillator 15 of FIG. 3, it is necessary to apply to it over the line a DC voltage in excess of the breakdown voltage of the particular triggerable electron device employed therein. One suitable unit for providing such voltage is shown in FIG. 6 to which attention is now directed.

A battery 26 serves as a source of DC voltage in excess of the predetermined magnitude required to initiate oscillation in the remote oscillator. A pair of terminals 27 and 28 is provided for connecting the test control unit to the line 12. Separate resistors 29 and 30 are connected at one end to a corresponding one of the terminals 27 and 28. A normally open test switch 31 is connected in series with the battery 26 between those ends of the resistors 29 and 30 which are remote from the terminals 27 and 28. The switch 31 provides a means for selectably connecting the source of DC voltage, the battery 26, to the line 12 through the resistors 29 and 30. Also connected between the terminals 27 and 28 is a series circuit including in sequence a first capacitor 32, a parallel network of an AC detector 33 and a pair of oppositely poled unidirectionally conductive devices 34 and 35, and a second capacitor 36.

Now referring to the system of FIG. 3, again, and assuming that the test control unit 16 consists of the circuit of FIG. 6 while the voltage controlled oscillator 15 consists of the oscillator of FIG. 4, the operation should be apparent. When test switch 31 is closed, a DC voltage will be applied over the line 12 to the voltage controlled oscillator 15 sufficient to initiate oscillation therein. The oscillation of the circuit of FIG. 4 serves to amplitude modulate the current flowing in the line 12. That is, the oscillation of the circuit of FIG. 4 superimposes an AC signal upon the line 12.

In the test control unit, the capacitors 32 and 36 serve as decoupling capacitors to prevent the DC voltage from the battery from reaching the AC detector 33. However, the capacitors 32 and 36 pass the AC signal to the detector 33. The latter may consist of a meter, simple earphones, or the like. In order to limit the voltage applied across the AC detector 33, there is provided the oppositely poled rectifiers or unidirectionally conductive devices 34 and 35.

In a typical system employing the control unit of FIG. 6, the battery voltage may be of the order of 85 volts, for example, while an ordinary set of earphones requires only a very small fraction thereof for operation.

It will be understood that if an AC signal is detected by the detector 33, it signifies integrity of the line 12. However, if upon application of the voltage from battery 26 there is no detection of signal by the detector 33, this indicates either a break or short circuit in the line 12.

It is often necessary to obtain more specific information as to the quality of the transmission line. For this purpose, use may be made of the circuit shown in FIG. 7.

Figure 7:
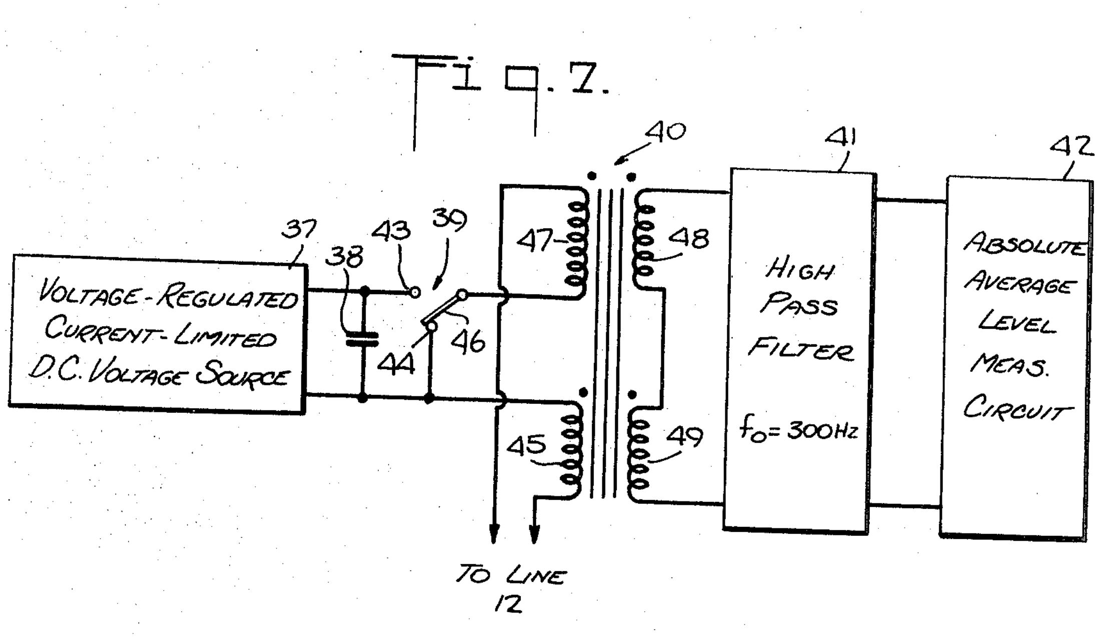
FIG. 7 is a schematic diagram of another test control means usable in the combination of FIG. 3.

As shown in FIG. 7, the test unit consists of a voltage-regulated current-limited DC voltage source 37, a capacitor 38, a single-pole double-throw switch 39, a signal transformer 40, a high pass filter 41, and an absolute average level measuring circuit 42. As shown, the condenser 38 is coupled directly across an output from the source 37. Fixed contacts 43 and 44 of the switch 39 are connected to opposite ends of capacitor 38. The terminal 44 is connected through one of the primary windings 45 of the transformer 40 to one side of the line 12 while the armature 46 of the switch 39 is connected through a second primary winding 47 of the transformer to the other side of the line 12. The secondary windings 48 and 49 of the transformer 40 are connected in series and to an input of the high pass filter 41. The output from the filter 41 is connected to an input of the measuring circuit 42.

With the test switch 39 in the position shown in FIG. 7, the source 37 is disconnected from the circuit. At the same time, the switch 39 provides a direct interconnection between the windings 45 and 47 of the transformer. This enables the line 12 to be used for normal communication.

When it is desired to test the line the switch 39 is manipulated to its alternative position connecting the source 37 to the line 12 through the primary windings 45 and 47 of transformer 40. Assuming that the line 12 is intact, the voltage controlled oscillator at the far point will be set into oscillation causing an AC signal to appear in the primary windings of transformer 40. Corresponding voltage will be produced in the secondary windings 48 and 49 and, assuming that the frequency of the AC signal exceeds the cut-off frequency of the filter (here indicated as 300 Hz.), the signal will pass therethrough to the measuring circuit 42. Since the voltage applied to the line 12 is maintained substantially constant by the stable source 37, any deviation of the signal measured by circuit 42 from a predetermined level will be indicative of the operating quality of line 12.

Figure 8:
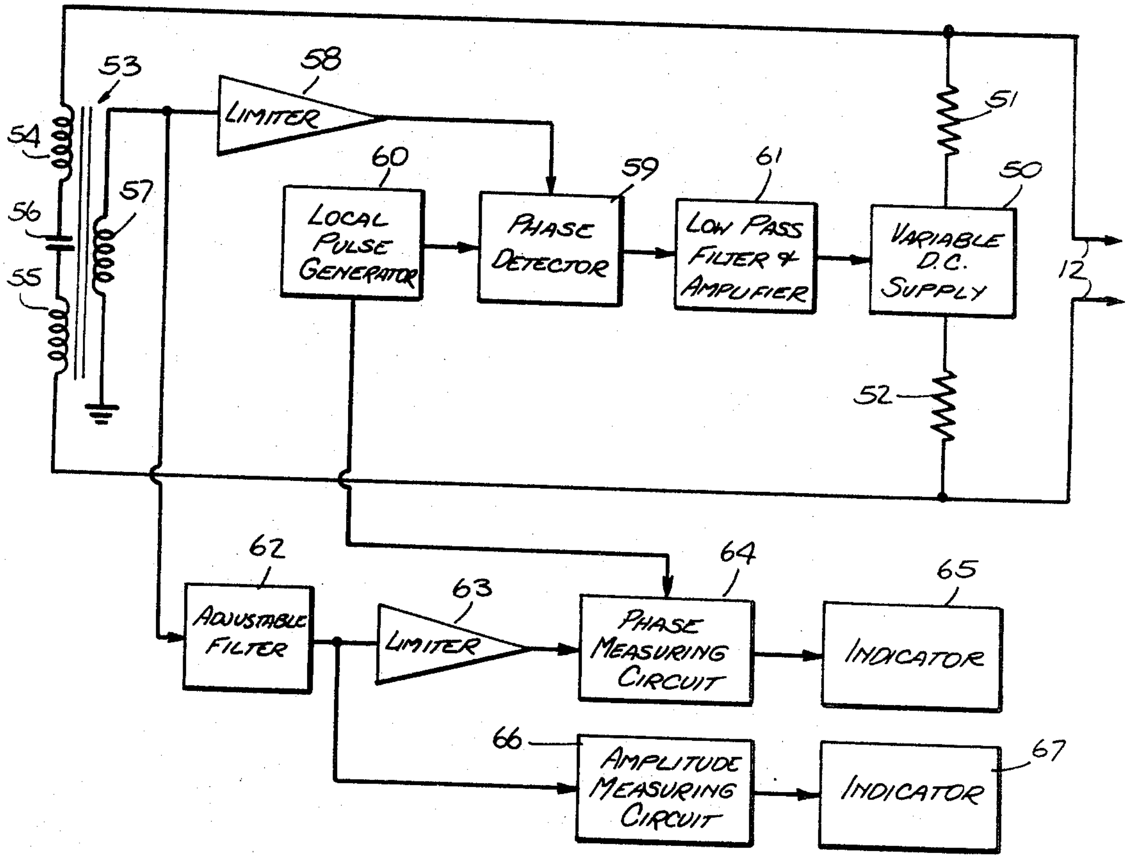
FIG. 8 is a schematic diagram of a further embodiment of the test control means employable in the combination of FIG. 3.

While the test control unit of FIG. 7 provides more information than that available from use of the control unit shown in FIG. 6, it is still possible to obtain further information by resorting to a control unit as shown in FIG. 8, to which attention is now directed. In FIG. 8, a variable DC supply 50 is shown connected through resistors 51 and 52 to the line 12. A transformer 53 has its primary windings 54 and 55 connected in series with a decoupling capacitor 56 across the line 12, as shown. The secondary winding 57 of transformer 53 is connected between ground or other point of reference potential and the input to a limiter amplifier 58. The output from the limiter 58 is applied to one input of a phase detector circuit 59. A second input to the phase detector 59 is supplied with an output from a local pulse generator or oscillator 60. The output from the phase detector is applied to a low pass filter and amplifier 61 from which it is applied in controlling fashion to the variable DC supply 50.

It will be recognized by those skilled in the art that the circuit described to this point with reference to FIG. 8 is in the nature of a phase lock loop which functions to control the source of voltage 50 in a direction to maintain a substantially fixed phase relationship between the A.C. signal generated by the remote voltage controlled oscillator and the local pulse generator 60. In this manner, it is possible to control remotely the repetition rate or frequency of oscillation of the remote voltage controlled oscillator so that it operates at a known frequency or repetition rate. Having stabilized the frequency of operation of the distant oscillator, it is possible to provide an indication of the phase delay or time delay introduced by the communication line 12 as well as its attenuation. This is accomplished by means of the application of the received AC signal to an input of an adjustable bandpass filter 62. The output from the filter 62 is applied over one channel through a limiter amplifier 63 to one input of a phase measuring circuit 64. The other input for the phase measuring circuit 64 is derived from an output of the local pulse generator or oscillator 60. The output of the phase measuring circuit is then applied to a suitable indicator 65.

The output from the adjustable filter 62 is applied over a separate channel to the input of an amplitude measuring circuit 66 whose output is applied to another suitable indicator 67. Thus, by adjusting the filter 62, it is possible to measure both the phase delay and the attenuation of the line 12 for the various harmonics of the AC signal provided by the remote oscillator. In this manner, the characteristics of the line for such harmonic frequencies are readily determined.

When the instant system is employed for testing a telephone line the DC voltage should be chosen along with the voltage source parameters such that an off-hook condition of a telephone set will drop the voltage at the set to a point below the energization level for the voltage controlled oscillator. Thus, an attempt to test the line when the telephone set is in operation will not interfere with normal telephone communication. It should also be understood that the frequency of oscillation of the voltage controlled oscillator should be such as not to initiate the ringing function in an associated telephone set when the system is employed in conjunction therewith. When the system is employed for testing other communication lines, appropriate choice of operating frequency and the like will be necessary to avoid interference with the normal communication traffic.

Figure 9:
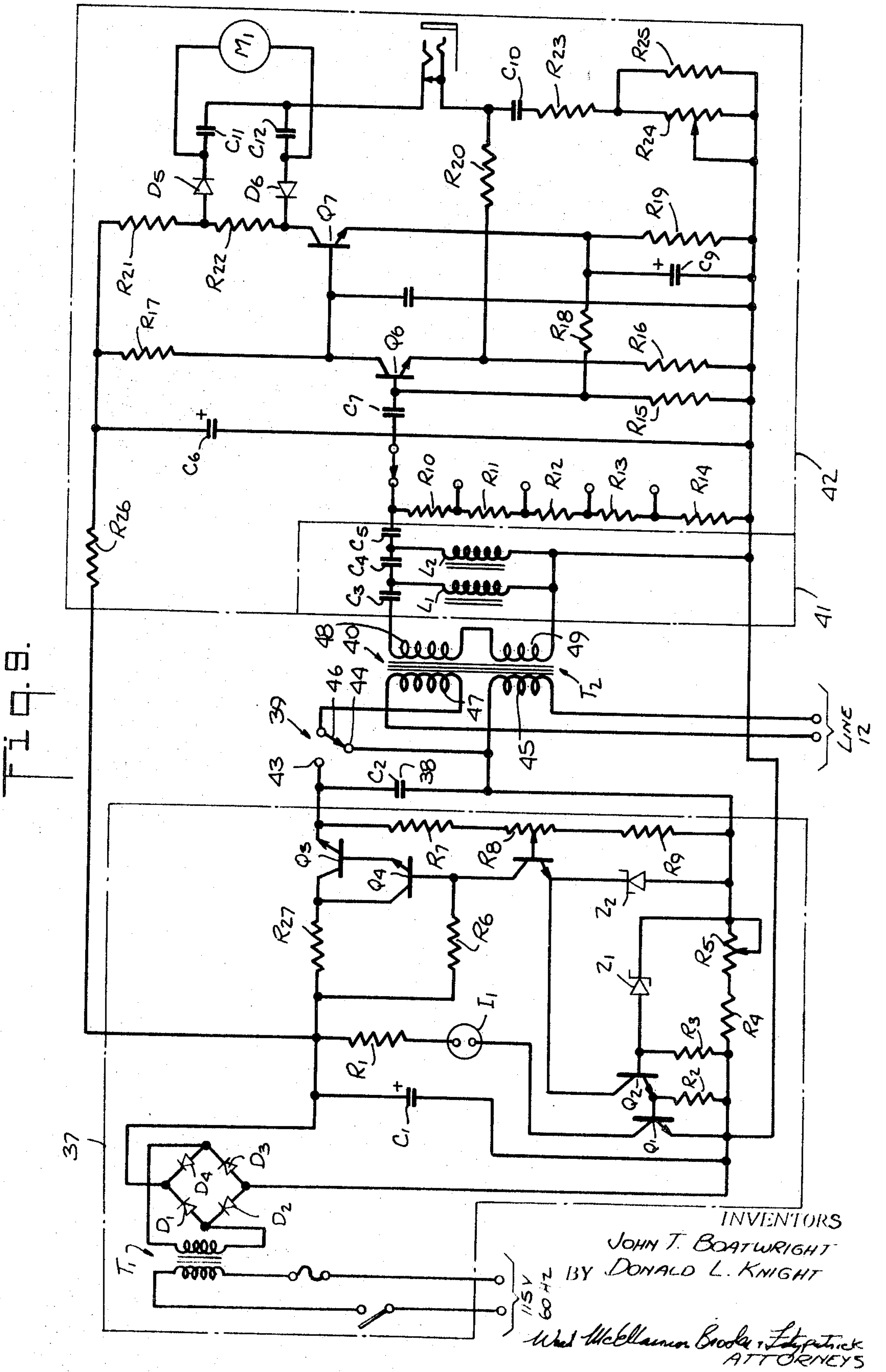
FIG. 9 is a detailed schematic diagram of an embodiment of the test control means of FIG. 7.

For purpose of illustration, there is shown in FIG. 9 the details of a unit of the type shown in general form in FIG. 7. The same reference numerals are used in both Figures to designate the same parts. A detailed list of circuit constants and parts follows from which the circuit can be reproduced. Its operation should be readily obvious from the description of FIG. 7. The transistors $Q_1$ and $Q_2$ are connected in a current limiting circuit while the indicator, or lamp I, indicates when current limiting occurs. Transistors $Q_3$, $Q_4$ and $Q_5$ are connected in a voltage regulating circuit. Resistors $R_{10}$ through $R_{14}$ provide a range selection attenuator. Adjustable resistor $R_{24}$ is used to calibrate the meter $M_1$.

In the following tabulation all resistance values are given in ohms with $K = \times 10^3$. All transistors are type 2N40327 except $Q_6$ which is type MPS 5615. All diodes are type IN2069.

RESISTORS

| | | | | | |
|---|---|---|---|---|---|
| $R_1$ | 100 K | $R_{10}$ | 10 K | $R_{19}$ | 4.7 K |
| $R_2$ | 22 K | $R_{11}$ | 10 K | $R_{20}$ | 9.1 K |
| $R_3$ | 100 K | $R_{12}$ | 10 K | $R_{21}$ | 33 K |
| $R_4$ | 220 | $R_{13}$ | 10 K | $R_{22}$ | 390 |
| *$R_5$ | | $R_{14}$ | 10 K | $R_{23}$ | 51 |
| $R_6$ | 100 K | $R_{15}$ | 10 K | $R_{24}$ | 100 |
| $R_7$ | 470 K | $R_{16}$ | 1 K | $R_{25}$ | 100 |
| $R_8$ | 100 K | $R_{17}$ | 91 K | $R_{26}$ | 10 K |
| $R_9$ | 200 K | $R_{18}$ | 56 K | $R_{27}$ | 3.9 K |

CAPACITORS

| | | |
|---|---|---|
| $C_1$ 20 mfd–250 V. | $C_5$ .1 mfd | $C_9$ 20 mfd |
| $C_2$ 10 mfd–50 V. | $C_6$ 20 mfd–150 V. | $C_{10}$ 20 mfd–20 V. |
| *$C_3$ | $C_7$ 0.47 mfd | $C_{11}$ 0.47 mfd |
| *$C_4$ | $C_8$ 0.001 mfd | $C_{12}$ 0.47 mfd |

*CHOKES: $L_1$ and $L_2$

*These values selected for desired filter cutoff characteristics.

| ZENER DIODES | | TRANSFORMERS | | |
|---|---|---|---|---|
| $Z_1$ | IN 762 | $T_1$ | Triad | N–48X |
| $Z_2$ | IN 769 | $T_2$ | Triad | S–58X |

| METER | INDICATOR |
|---|---|
| $M_1$ 500 microampere | $I_1$ neon NE2 |

Having described the invention with reference to the presently preferred embodiments thereof, it will be readily apparent to those skilled in the art that numerous changes in structure may be made without departing from the true spirit of the invention.

What is claimed is:

1. A system for testing between two distant points an interconnecting communication line which is capable of cummunicating therebetween a DC voltage and an AC signal, said system comprising in combination: voltage controlled oscillator means permanently connected across said line at one of said points, said oscillator means being insensitive to low DC voltage but being triggerable into oscillation by the application of a DC voltage thereto from said line in excess of predetermined magnitude for generating and applying a characteristic AC signal to said line, said oscillations continuing so long as said excess DC voltage is applied to said line; and test control means arranged to be coupled to said line at the other of said points, said test control means including means for detecting said characteristic signal.

2. A system according to claim 1, wherein said oscillator means comprises a relaxation oscillator circuit employing an electron device having a negative resistance characteristic between a breakdown voltage point and a sustaining voltage point.

3. A system according to claim 2, wherein said oscillator means comprises a parallel resistance and capacitance time constant circuit connected in series with said electron device across said line, said electron device being a semi-conductor device.

4. A system according to claim 1, wherein said oscillator means comprises a parallel resistance and capacitance time constant circuit connected in series with a gaseous discharge device across said line.

5. A system according to claim 1, wherein said DC voltage applying means comprises a source of DC voltage in excess of said predetermined magnitude, and means for selectably connecting said source across said line; and wherein said detecting means comprises an AC signal detector, and DC decoupling means for interconnecting said detector across said line.

6. A system according to claim 1, wherein said test control means comprises a source of DC voltage in excess of said predetermined magnitude, a pair of terminals for connecting the test control means to said line, a separate resistor connected at one end to a corresponding one of said terminals, means for selectably connecting said source of D.C. voltage between the free ends of said resistors, and a series circuit connected between said terminals, said series circuit including in sequence a first capacitor, a parallel network of an A.C. detector and a pair of oppositely poled unidirectionally conductive devices, and a second capacitor.

7. A system according to claim 1, wherein said DC voltage applying means comprises a stable voltage-regulated current-limited source of DC voltage in excess of said predetermined magnitude, and means for selectably connecting said source across said line; and wherein said detecting means comprises a calibrated AC signal level measuring device.

8. A system according to claim 7, wherein said oscillator means comprises a relaxation oscillator circuit of the type which shifts from the dormant to the oscillatory state during the application thereto of a DC voltage in excess of said predetermined magnitude and amplitude modulates the current flowing through it while it is oscillating.

9. A system for testing between two distant points an interconnecting communication line which is capable of communicating therebetween a DC voltage and an A.C. signal, said system comprising in combination: voltage controlled oscillator means coupled across said line at one of said points, said oscillator means being insensitive to low DC voltage but being triggerable into oscillation by the application of a DC voltage thereto from said line in excess of a predetermined magnitude for generating and applying a characteristic AC signal to said line; and test control means arranged to be coupled to said line at the other of said points, said test control means including means for selectably applying to said line a DC voltage in excess of said predetermined magnitude, and means for detecting said characteristic signal, said test control means comprising a stable voltage-regulated current-limited source of DC voltage in excess of said predetermined magnitude, a signal transformer having primary and secondary windings, means connecting said source of DC voltage in series with said primary winding for connection across said line, a high pass filter, an absolute average level measuring circuit, and means coupling said secondary winding to an input of said filter and an output of said filter to an input of said measuring circuit.

10. A system for testing between two distant points an interconnecting communication line which is capable of communicating therebetween a DC voltage and an AC signal, said system comprising in combination: voltage controlled oscillator means coupled across said line at one of said points, said oscillator means being insensitive to low DC voltage but being triggerable into oscillation by the application of a DC voltage thereto from said line in excess of a predetermined magnitude for generating and applying a characteristic AC signal to said line; and test control means arranged to be coupled to said line at the other of said points, said test control means including means for selectably applying to said line a DC voltage in excess of said predetermined magnitude, and means for detecting said characteristic signal, said oscillator means being of the type that oscillates at a frequency which is a function of the applied DC voltage, and wherein said test control means comprises an adjustable source of DC voltage coupled across said line, a local oscillator, means for comparing the phase said characteristic AC signal as received at said other point of said line with an output from said local oscillator and controlling said source of voltage in a direction to maintain a substantially fixed phase relationship between AC signal and said output from the local oscillator, and means for measuring a parameter of said received AC signal.

11. A system according to claim 10, wherein a phase measuring circuit is provided for measuring the phase difference between said received AC signal and said output from the local oscillator.

12. A system according to claim 10, wherein an amplitude measuring circuit is provided for measuring the amplitude of said received AC signal.

13. A system according to claim 11, wherein an adjustable bandpass filter is interposed between said line and said phase measuring circuit for restricting the measurement to a selectable frequency.

14. A system according to claim 12, wherein an adjustable bandpass filter is interposed between said line and said amplitude measuring circuit for restricting the measurement to a selectable frequency.

15. A system for testing a telephone line between a near test point and a distant telephone set without interfering with the normal communication traffic thereon comprising in combination voltage controlled oscillator means connected across said line at said telephone set, said oscillator means being insensitive to low DC voltage but being triggerable into oscillation by the application of a DC voltage thereto from said line in excess of a predetermined magnitude for generating and applying a characteristic AC signal to said line, said predetermined magnitude being in excess of the maximum voltage normally present on the line and said characteristic AC signal being incapable of initiating a ringing function in said telephone set; and test control means arranged to be coupled to said line at said near test point, said test control means including a source of DC voltage in excess of said predetermined magnitude, means for coupling said source to said line, and means for detecting said characteristic signal, the arrangement being such that an off-hook condition of said telephone set prevents triggering of said oscillator means.

* * * * *